United States Patent
Bay

(12) 
(10) Patent No.: US 6,590,537 B2
(45) Date of Patent: Jul. 8, 2003

(54) LOCAL WIRELESS DIGITAL TRACKING NETWORK

(76) Inventor: Fm Bay, 1072 Firth Ct., Sunnyvale, CA (US) 94087

( * ) Notice: Subject to any disclaimer, the term of this patent is extended or adjusted under 35 U.S.C. 154(b) by 0 days.

(21) Appl. No.: 09/900,431

(22) Filed: Jul. 9, 2001

(65) Prior Publication Data

US 2003/0006935 A1 Jan. 9, 2003

(51) Int. Cl.[7] ................................. G01S 3/02
(52) U.S. Cl. ........................ 342/463; 342/457
(58) Field of Search ............... 342/463, 464, 342/465, 457

(56) References Cited

U.S. PATENT DOCUMENTS

| | | | | | |
|---|---|---|---|---|---|
| 4,742,357 | A | * | 5/1988 | Rackley | 342/457 |
| 5,003,317 | A | * | 3/1991 | Gray et al. | 342/457 |
| 5,510,801 | A | * | 4/1996 | Engelbrecht et al. | 342/457 |
| 5,812,522 | A | * | 9/1998 | Lee et al. | 370/206 |
| 5,912,644 | A | * | 6/1999 | Wang | 342/457 |
| 6,127,976 | A | * | 10/2000 | Boyd et al. | 342/463 |
| 6,317,082 | B1 | * | 11/2001 | Bacon et al. | 342/465 |
| 6,348,856 | B1 | * | 2/2002 | Jones et al. | 340/10.1 |

* cited by examiner

Primary Examiner—Theodore M. Blum

(57) ABSTRACT

The present invention provides a method for the real-time location of a multiplicity of Mobile Units by correlating a commanded radio signal from the specific Mobile Units received by multiple fixed antennae. The Mobile Units are equipped with a transceiver that is activated by an encoded broadcast and responds with a burst transmission on a separate frequency that is received by several well-surveyed antennae at slightly different times due to the variable distance of the Mobile Units to the Fixed Receiver antennae. The location of a Mobile Unit is determined by resolving the burst transmission time delay differences from at least four fixed antennae to eliminate the common system unknowns.

5 Claims, 3 Drawing Sheets

Master Station Initiator Message Structure

| System identifier | System time stamp | Mobile Unit identifier | inquiry sequence | message end |
|---|---|---|---|---|
| [200] | [205] | [210] | [215] | [220] |

*Fig.2*

Mobile Unit Response Message Structure

| System identifier | Mobile Unit identifier | System time stamp | inquiry sequence | message end |
|---|---|---|---|---|
| [300] | [305] | [310] | [315] | [320] |

*Fig. 3*

Fixed Receiver Reporting Message Structure

| System identifier | Fixed Station identifier | Mobile Unit identifier | receipt time stamp | System time stamp | inquiry sequence | message end |
|---|---|---|---|---|---|---|
| [400] | [405] | [410] | [415] | [420] | [425] | [430] |

*Fig. 4*

Mobile Unit Location Calculations $$z_M = ((((y_D d'_{MA} - y_A d'_{MD} - ((x_A d'_{MD} - x_D d'_{MA})/(x_A d'_{MB} - x_B d'_{MA})) y_B d'_{MA} + ((x_A d'_{MD} - x_D d'_{MA})/(x_A d'_{MB} - x_B d'_{MA})) y_A d'_{MB})/(y_C d'_{MA} - y_A d'_{MC} - ((x_C d'_{MA} - x_A d'_{MC})/(x_B d'_{MA} - x_A d'_{MB})) y_B d'_{MA} + ((x_C d'_{MA} - x_A d'_{MC})/(x_B d'_{MA} - x_A d'_{MB})) y_A d'_{MB})) ((1/2\, d'^2_{MA} d'_{MC} - 1/2\, d'^2_{MC} d'_{MA} - 1/2\, d_A^2 d'_{MC} + 1/2\, d_C^2 d'_{MA}) - (((y_D d'_{MA} - y_A d'_{MD} - ((x_A d'_{MD} - x_D d'_{MA})/(x_A d'_{MB} - x_B d'_{MA})) y_B d'_{MA} + ((x_A d'_{MD} - x_D d'_{MA})/(x_A d'_{MB} - x_B d'_{MA})) y_A d'_{MB})/(y_C d'_{MA} - y_A d'_{MC} - ((x_C d'_{MA} - x_A d'_{MC})/(x_B d'_{MA} - x_A d'_{MB})) y_B d'_{MA} + ((x_C d'_{MA} - x_A d'_{MC})/(x_B d'_{MA} - x_A d'_{MB})) y_A d'_{MB}))(1/2\, ((x_C d'_{MA} - x_A d'_{MC})/(x_B d'_{MA} - x_A d'_{MB})) d'^2_{MA} d'_{MB} - 1/2\, ((x_C d'_{MA} - x_A d'_{MC})/(x_B d'_{MA} - x_A d'_{MB})) d'^2_{MB} d'_{MA} - 1/2\, ((x_C d'_{MA} - x_A d'_{MC})/(x_B d'_{MA} - x_A d'_{MB})) d_A^2 d'_{MB} + 1/2\, ((x_C d'_{MA} - x_A d'_{MC})/(x_B d'_{MA} - x_A d'_{MB})) d_B^2 d'_{MA}) - ((1/2\, d'^2_{MA} d'_{MD} - 1/2\, d'^2_{MD} d'_{MA} - 1/2\, d_A^2 d'_{MD} + 1/2\, d_D^2 d'_{MA}) + ((1/2\, ((x_A d'_{MD} - x_D d'_{MA})/(x_A d'_{MB} - x_B d'_{MA})) d'^2_{MA} d'_{MB} - 1/2\, ((x_A d'_{MD} - x_D d'_{MA})/(x_A d'_{MB} - x_B d'_{MA})) d'^2_{MB} d'_{MA} - 1/2\, ((x_A d'_{MD} - x_D d'_{MA})/(x_A d'_{MB} - x_B d'_{MA})) d_A^2 d'_{MB} + 1/2\, ((x_A d'_{MD} - x_D d'_{MA})/(x_A d'_{MB} - x_B d'_{MA})) d_B^2 d'_{MA})))/((((y_D d'_{MA} - y_A d'_{MD} - ((x_A d'_{MD} - x_D d'_{MA})/(x_A d'_{MB} - x_B d'_{MA})) y_B d'_{MA} + ((x_A d'_{MD} - x_D d'_{MA})/(x_A d'_{MB} - x_B d'_{MA})) y_A d'_{MB})/(y_C d'_{MA} - y_A d'_{MC} - ((x_C d'_{MA} - x_A d'_{MC})/(x_B d'_{MA} - x_A d'_{MB})) y_B d'_{MA} + ((x_C d'_{MA} - x_A d'_{MC})/(x_B d'_{MA} - x_A d'_{MB})) y_A d'_{MB})) z_C d'_{MA} - (((y_D d'_{MA} - y_A d'_{MD} - ((x_A d'_{MD} - x_D d'_{MA})/(x_A d'_{MB} - x_B d'_{MA})) y_B d'_{MA} + ((x_A d'_{MD} - x_D d'_{MA})/(x_A d'_{MB} - x_B d'_{MA})) y_A d'_{MB})/(y_C d'_{MA} - y_A d'_{MC} - ((x_C d'_{MA} - x_A d'_{MC})/(x_B d'_{MA} - x_A d'_{MB})) y_B d'_{MA} + ((x_C d'_{MA} - x_A d'_{MC})/(x_B d'_{MA} - x_A d'_{MB})) y_A d'_{MB})) z_A d'_{MC} - (((y_D d'_{MA} - y_A d'_{MD} - ((x_A d'_{MD} - x_D d'_{MA})/(x_A d'_{MB} - x_B d'_{MA})) y_B d'_{MA} + ((x_A d'_{MD} - x_D d'_{MA})/(x_A d'_{MB} - x_B d'_{MA})) y_A d'_{MB})/(y_C d'_{MA} - y_A d'_{MC} - ((x_C d'_{MA} - x_A d'_{MC})/(x_B d'_{MA} - x_A d'_{MB})) y_B d'_{MA} + ((x_C d'_{MA} - x_A d'_{MC})/(x_B d'_{MA} - x_A d'_{MB})) y_A d'_{MB}))((x_C d'_{MA} - x_A d'_{MC})/(x_B d'_{MA} - x_A d'_{MB})) z_B d'_{MA} + (((y_D d'_{MA} - y_A d'_{MD} - ((x_A d'_{MD} - x_D d'_{MA})/(x_A d'_{MB} - x_B d'_{MA})) y_B d'_{MA} + ((x_A d'_{MD} - x_D d'_{MA})/(x_A d'_{MB} - x_B d'_{MA})) y_A d'_{MB})/(y_C d'_{MA} - y_A d'_{MC} - ((x_C d'_{MA} - x_A d'_{MC})/(x_B d'_{MA} - x_A d'_{MB})) y_B d'_{MA} + ((x_C d'_{MA} - x_A d'_{MC})/(x_B d'_{MA} - x_A d'_{MB})) y_A d'_{MB}))((x_C d'_{MA} - x_A d'_{MC})/(x_B d'_{MA} - x_A d'_{MB})) z_A d'_{MB} - z_D d'_{MA} + z_A d'_{MD} + ((x_A d'_{MD} - x_D d'_{MA})/(x_A d'_{MB} - x_B d'_{MA})) z_B d'_{MA} - ((x_A d'_{MD} - x_D d'_{MA})/(x_A d'_{MB} - x_B d'_{MA})) z_A d'_{MB})$$

$$y_M = (((1/2\, d'^2_{MA} d'_{MC} - 1/2\, d'^2_{MC} d'_{MA} - 1/2\, d_A^2 d'_{MC} + 1/2\, d_C^2 d'_{MA}) - ((1/2\, ((x_C d'_{MA} - x_A d'_{MC})/(x_B d'_{MA} - x_A d'_{MB})) d'^2_{MA} d'_{MB} - 1/2\, ((x_C d'_{MA} - x_A d'_{MC})/(x_B d'_{MA} - x_A d'_{MB})) d'^2_{MB} d'_{MA} - 1/2\, ((x_C d'_{MA} - x_A d'_{MC})/(x_B d'_{MA} - x_A d'_{MB})) d_A^2 d'_{MB} + 1/2\, ((x_C d'_{MA} - x_A d'_{MC})/(x_B d'_{MA} - x_A d'_{MB})) d_B^2 d'_{MA})) - z_C z_M d'_{MA} + z_A z_M d'_{MC} + ((x_C d'_{MA} - x_A d'_{MC})/(x_B d'_{MA} - x_A d'_{MB})) z_B z_M d'_{MA} - ((x_C d'_{MA} - x_A d'_{MC})/(x_B d'_{MA} - x_A d'_{MB})) z_A z_M d'_{MB})/(y_C d'_{MA} - y_A d'_{MC} - ((x_C d'_{MA} - x_A d'_{MC})/(x_B d'_{MA} - x_A d'_{MB})) y_B d'_{MA} + ((x_C d'_{MA} - x_A d'_{MC})/(x_B d'_{MA} - x_A d'_{MB})) y_A d'_{MB})$$

$$x_M = (1/2\, d'^2_{MA} d'_{MB} - 1/2\, d'^2_{MB} d'_{MA} - 1/2\, d_A^2 d'_{MB} + 1/2\, d_B^2 d'_{MA} - y_B y_M d'_{MA} + y_A y_M d'_{MB} - z_B z_M d'_{MA} + z_A z_M d'_{MB})/(x_B d'_{MA} - x_A d'_{MB})$$

Where:
- $x_A\ y_A\ z_A$ are the coordinates of the 'A' Fixed Receiver
- $x_B\ y_B\ z_B$ are the coordinates of the 'B' Fixed Receiver
- $x_C\ y_C\ z_C$ are the coordinates of the 'C' Fixed Receiver
- $x_D\ y_D\ z_D$ are the coordinates of the 'D' Fixed Receiver
- $x_M\ y_M\ z_M$ are the coordinates of the Mobile Unit
- $d_A$ is the distance from the 'A' Fixed Receiver to the Master Station
- $d_B$ is the distance from the 'B' Fixed Receiver to the Master Station
- $d_C$ is the distance from the 'C' Fixed Receiver to the Master Station
- $d_D$ is the distance from the 'D' Fixed Receiver to the Master Station
- $d'_{MA}$ is the apparent distance from the Mobile Unit to the 'A' Fixed Receiver determined by the measured time between the Master Station broadcast and the 'A' Fixed Receiver receipt of the Mobile Unit response broadcast
- $d'_{MB}$ is the apparent distance from the Mobile Unit to the 'B' Fixed Receiver determined by the measured time between the Master Station broadcast and the 'B' Fixed Receiver receipt of the Mobile Unit response broadcast
- $d'_{MC}$ is the apparent distance from the Mobile Unit to the 'C' Fixed Receiver determined by the measured time between the Master Station broadcast and the 'C' Fixed Receiver receipt of the Mobile Unit response broadcast
- $d'_{MD}$ is the apparent distance from the Mobile Unit to the 'D' Fixed Receiver determined by the measured time between the Master Station broadcast and the 'D' Fixed Receiver receipt of the Mobile Unit response broadcast

*Fig. 5*

LOCAL WIRELESS DIGITAL TRACKING NETWORK

BACKGROUND OF THE INVENTION

1. Field of the Invention

The present invention relates generally to the real-time location of Mobile Units by correlating an on-demand radio signal received by multiple antennae. The Mobile Units are equipped with a transceiver that is activated by an encoded broadcast and responds with a burst transmission that is received by several well-surveyed antennae at slightly different times due to the variable distance of the Mobile Units to the Fixed Receiver antennae. The location of a Mobile Unit is determined by resolving the time delay differences from the antennae.

2. Related Art

There are other methods of locating the source of a radio broadcast in real-time, however, each has performance or implementation shortcomings.

The use of fixed directional antennae to receive an omni-directional broadcast from the source to be located allows a line-of-sight correlation from two or more receiver locations to determine the location of the broadcast point. The number of receivers required to determine the broadcast source is dependent on the volume of the space under regard. The search volume is divided into segments radiating from each fixed receiver and an antenna element is dedicated to each segment. The more precision desired in the location determination requires more segments and depending on the configuration of the search volume more antennae. The infrastructure necessary to achieve the location precision achievable with the present invention is much more complex for this approach than the infrastructure of the present invention.

Other implementations of real-time electronic locating use the varying time delay to multiple receivers of a periodic transmission from the mobile unit to be located to correlate the position of the source. This approach uses a mobile unit-generated broadcast with a synchronized and precise time tag to allow the time variability of receipt at multiple, fixed, remote receiving antennae to be correlated to a single accurate location. The use of mobile unit-generated signals necessitates a continuous tracking system and does not provide for privacy when the mobile unit to be located is an individual. The period of the mobile unit broadcast is fixed for each mobile unit and a broadcast spectrum allocation made to accommodate each mobile unit. The allocation of broadcast spectrum introduces an inherent limitation to the quantity of deployed mobile units. This technology has been successfully deployed as an inventory management tool where the multiple sources to be tracked are relatively slow moving allowing an extended period between broadcasts for each source. In addition, the inventory management broadcast equipment is readily re-used and compatible with the expense of many synchronized, precision clocks.

There are also real-time locating systems that use the Global Positioning System as the source of location information and wireless communications infrastructure for reporting the mobile unit position to a master control center. The limitations of the GPS low signal power in penetrating structures and dense foliage create significant system coverage outages and reduce the utility of the method. The mobile equipment requires both a GPS receiver and a wireless communications device and is packaged in a larger physical configuration than the present invention. The absence of a universal standard for wireless communications and the lack of ubiquitous coverage limit the operational utility of this approach.

SUMMARY OF THE INVENTION

The present invention is an on-demand real-time locating system for people or products using radio frequency broadcasts. The system uses an unlicensed family use radio frequency in the 40014 450 MHz band in confined areas of concern by placing Fixed Receiver antennae within and on the periphery of the area. The present invention supports the real-time locating of multiple low signal power broadcast sources within the range of the fixed receivers by using digital frequency re-use techniques, unique digital identification codes, and parallel processing of a time ambiguous mathematical determination of the location of each source.

A master broadcast center of the present invention transmits a high power radio frequency signal throughout the volume of concern to be received by all mobile receivers attached to the subjects to be located. The master signal structure is a digital construct containing a reference time tag and a string of activation codes for the mobile receivers of interest in each packet. The packets are broadcast in a continuous series activating a different set of codes with each packet. The high power signal can penetrate the local area structures and activate the mobile transponders anywhere within the volume of concern.

The mobile transponder of the present invention responds to the activation signal by generating a low power broadcast on a separate, but also 400–450 MHz band, frequency. The low power signal minimizes the size, complexity, battery power needs, and cost of the Mobile Unit and makes it less intrusive for personal use. The low power signal, however, requires more than the minimum number of Fixed Receiver antennae because the signal is more easily interfered with by local structures. The present invention uses a Fixed-Receiver-geometry-sensitive determination to choose the best available combination of Fixed Receivers to resolve the location of the mobile transponder.

The time ambiguous mathematical determination of the mobile transponder location at the time of the low power broadcast is accomplished by selecting the four best Fixed Receivers to provide the most diverse geometry to provide the minimum location error. The mathematics simultaneously solves four equations to permit the resolution of the mobile transponder location in three physical dimensions and without a synchronized clocking system for the mobile transponder and Master Station. By eliminating the need for an accurate and synchronized Mobile Unit clock the Mobile Unit complexity, size, and costs are reduced.

Each Mobile Unit is provided with a unique digital identification via radio frequency identification technologies. The radio frequency identification is used to pinpoint the location of a Mobile Unit by using a portable radio frequency interrogator, when necessary. Further, the radio frequency identification can also be used to provide proof of identification and authorization for requests to locate other Mobile Units when used for tracking people or personal property. The central processing center is provided with an access database to correlate individuals of groups with their associates. A member of a group is authorized to request the real-time location of any or all of the members of their group.

Further, when applied to locating people the Mobile Unit includes an integrity band secured around the wearer's wrist. Any broach of the integrity of the band will trigger a broadcast from the Mobile Unit containing a message for the central processing center. The message alerts the system of the security breech and identifies the location of the incident. Each Mobile Unit retains the time-tag from the latest master broadcast center broadcast regardless of the whether its activation code was included in the message. Depending on the purpose of the system, the features associated with the real-time locating and identification verification capabilities are disabled by the incident.

BRIEF DESCRIPTION OF THE FIGURES

The present invention will be described with reference to the accompanying drawings.

FIG. 2 is depicts the typical message structure of the initiating Master Station broadcast.

FIG. 3 depicts the typical message structure of the Mobile Unit response broadcast.

FIG. 4 depicts the typical message structure of the Fixed Receiver reporting to the Master Station.

FIG. 5 is an algebraic representation of the equations to be resolved to convert the Fixed Receiver reported information into a three-dimensional location of the responding Mobile Unit.

DETAILED DESCRIPTION OF THE PREFERRED EMBODIMENTS

Figure 1:
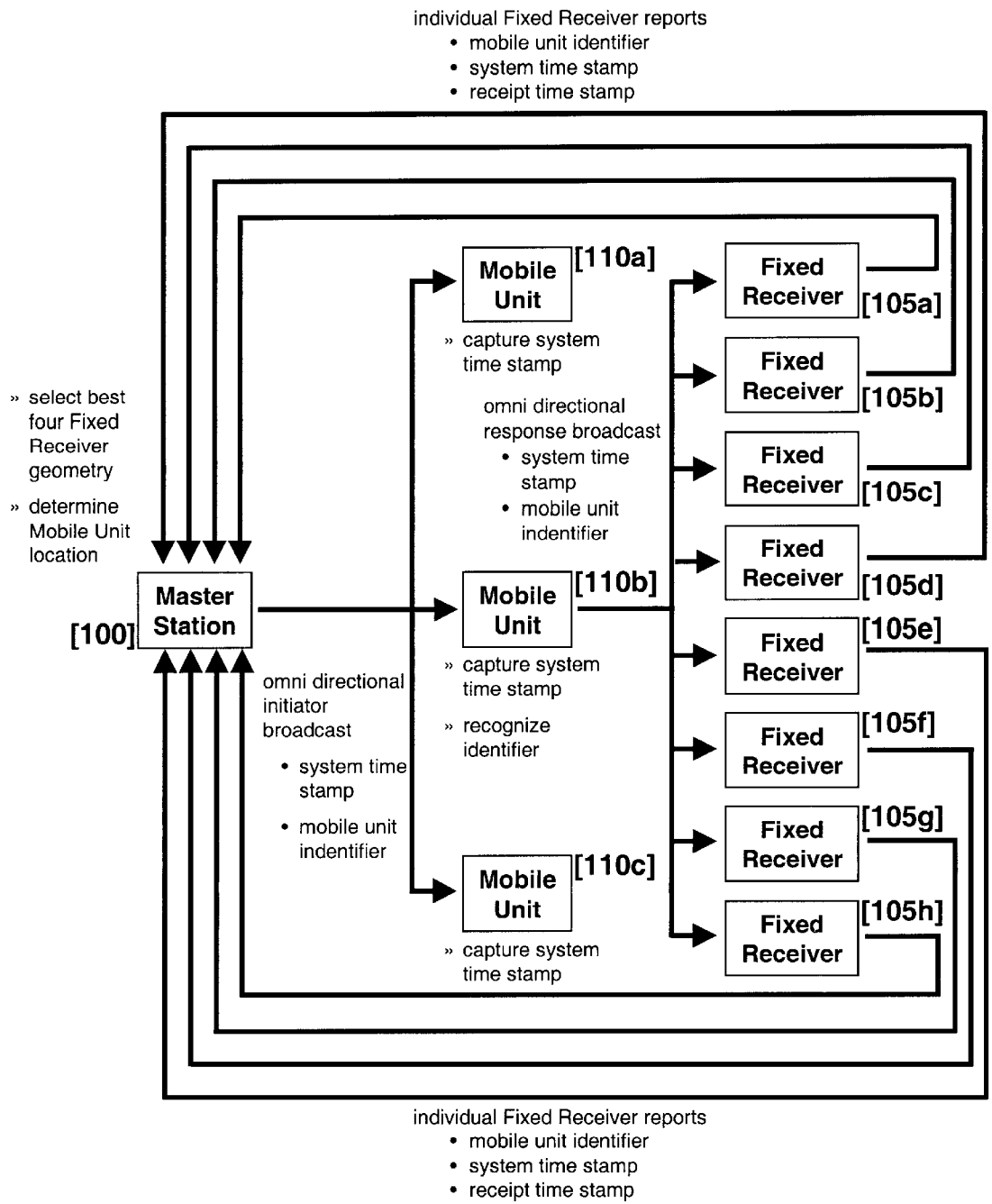
FIG. 1 is a system block diagram of the local wireless tracking network.

The present invention is described in terms of the following example. This is for convenience only and is not intended to limit the application of the present invention. In fact, after reading the following description, it will be apparent to one skilled in the relevant art how to implement the present invention in alternative embodiments.

FIG. 1 is a representative block diagram of a typical system for real-time, on-demand locating of mobile elements. The Master Station [100] and Fixed Receivers [105a–h] are positioned in surveyed locations such that the relationship between each is well known. The two-way connectivity of the Master Station [100] to each Fixed Receiver [105] provides the means for a system time synchronization and the reporting from the Fixed Receivers [105a–h] of the Mobile Unit [110] responses to the Master Station [100] broadcasts. The Master Station [100] broadcast to the Mobile Units [110a–c] is an omni-directional wireless transmission at a selected frequency and of sufficient power to overcome the potential blockage and interference of local structures. The Mobile Unit [110] response broadcast is a wireless transmission at a different frequency and low power. The Mobile Unit [110] broadcast frequency and power levels are selected to minimize the size, weight, power supply demands, and cost of the Mobile Unit [110] hardware. Sufficient Fixed Receivers [105a–h] are located within and at the perimeter of the area of regard of the system to ensure that at least four Fixed Receivers [105a–h] will receive the Mobile Unit [110] broadcast.

FIG. 2 is a general description of the message structure of the Master Station [100] broadcast that triggers a Mobile Unit [110] response. The lead-in bits representing the System Identifier [200] assure that similar implementations in close proximity do not become false alarms. The System Time Stamp [205] is provided to all Mobile Units [110a–c] as a local oscillator update and reference for emergency broadcasts. The Mobile Unit Identifier [210] selectively activates the Mobile Unit [110] with a matching embedded identifier code to respond with a broadcast to the Fixed Receivers [105a–h]. An Inquiry Sequence [215] follows the Mobile Unit Identifier [210] segment to identify the specific position in a string of Master Station [100] initiating broadcasts of each message for ease in reassembling sequence for short term tracking of the Mobile Unit [110]. The End Message [220] bits allow the Mobile Unit Identifier [210] segment of the message to contain the activation codes of multiple Mobile Units [210].

FIG. 3 is a general description of the message structure of the Mobile Unit [110] response to a Master Station [100] activation code. The lead-in bits representing the System Identifier [300] assure that similar implementations in close proximity do not become false alarms. The Mobile Unit Identifier [305] is the embedded code of the responding Mobile Unit [110]. The System Time Stamp [310] is the same time stamp provided in the Master Station [100] activation message. The Inquiry Sequence [315] following the Mobile Unit Identifier [310] segment is the same Inquiry Sequence [215] provided by the Master Station [100] broadcast to identify the specific position in a string of Master Station [100] initiating broadcasts of each message. The End Message [320] bits signify a Mobile Unit [100] broadcast termination.

FIG. 4 is a general description of the Fixed Receiver [105] reporting message sent via the system network to the Master Station [100]. The lead-in bits representing the System Identifier [400] assure that similar implementations in close proximity do not become false alarms for systems using wireless communications in the system network. The Fixed Receiver Identifier [405] is used to establish a cross-reference of the reporting Fixed Receiver [105] location relative to the Master Station [100]. The Mobile Unit Identifier [410] is the embedded code of the Mobile Unit [110] being reported on. The Receipt Time Stamp [415] is the system time kept at the Fixed Receiver [105] when the Mobile Unit [110] response was received. The System Time Stamp [420] is the same time stamp provided by the Master Station [100] activation message that was included in the Mobile Unit [110] response broadcast. The Inquiry Sequence [425] following the System Time Stamp [420] is the same Inquiry Sequence [315] provided by Master Station [100] broadcast message that was included in the Mobile Unit [110] response broadcast to identify the specific position in a string of Master Station [100] initiating broadcasts of each message. The End Message [430] bits signify a Fixed Receiver [105] report termination.

The Master Station [100] correlates all Fixed Receiver [105a–h] reports from the same Mobile Unit [110] activated by the same original Master Station [100] broadcast. The receipt of more than four Fixed Receiver [105a–h] reports requires a determination of the most widely diverse geometric relationship of four Fixed Receivers [105a–h] to provide a data set with the best possible resolution. The Master Station [100] uses the known three-dimensional relationships of the reporting Fixed Receivers [105a–h] to the Master Station [100] and calculates the most geometrically diverse set of four reporting Fixed Receivers [105a–h]. The difference between the Receipt Time Stamp [415] assigned by each Fixed Receiver [105a–h] and the System Time Stamp [205] established by the Master Station [100] activation broadcast is used as a basis for calculating the pseudo-distance between the Master Station [100] and the Mobile Unit [110] by way of the Fixed Receiver [105]. The difference is a pseudo-distance because there are variable processing time delays in the Mobile Unit [110] hardware that can only be estimated. Since the Mobile Unit [110]

processing time delay is constant for each omni-directional response to be received at the Fixed Receivers [105a–h], the error can be eliminated in the final location calculations.

FIG. 5 is the algebraic representation of the calculations performed to convert the calculated pseudo-distances between the Master Station [100] and responding Mobile Unit [110] from the four selected Fixed Receivers [105] and the known three-dimensional relationship between the Master Station [100] and the four selected Fixed Receivers [105] into a three-dimensional location determination of the responding Mobile Unit [110] at the time of the Mobile Unit [110] response broadcast.

The nature of the Mobile Unit [110] allows for an unmeasured movement in the time from Mobile Unit [110] response broadcast to the time of a location determination of that Mobile Unit [110]. However, if the Master Station [100] were to issue a series of activation messages for the same Mobile Unit [110], a time delayed history of the Mobile Unit [110] movements would be captured and predictive algorithms could be used to project the future location of the Mobile Unit [110].

The equations of FIG. 5 are typical of the approach and have been derived by solving the multiple equations and multiple unknowns for $z_M$, then $y_M$, and finally $x_M$ to establish the three-dimensional coordinates of the location of the Mobile Unit [110] relative to the well-known Master Station [100] location at the time of receipt of the Master Station [100] initiating broadcast. The apparent distance from the Mobile Unit [110] to a Fixed Receiver [105] is simply the time difference between the Master Station [100] initiation message time tag and the Fixed Receiver [105] receipt time tag times the speed of light. The derivation could have been performed in various orders of solution for each of the three dimensions, but the structure of the resulting equations would be similar. The derivation could also have been performed in other than a Cartesian coordinate system, but a translation of the resulting equations to a Cartesian coordinate system would result in a similar equation structure.

What is claimed is:

1. A system comprised of a broadcasting master station, a multiplicity of fixed receivers, and a multiplicity of mobile transceiver units wherein the master station initiates the process of locating specific mobile transceiver units with a periodic broadcast;

the fixed receivers are used as reference points for multi-lateration of the mobile transceiver units;

the mobile transceiver units respond to the master station;

the master station broadcast and the mobile transceiver broadcasts are on separate frequencies;

the master station broadcast activates a specific mobile transceiver unit to respond by embedding a unique mobile transceiver unit identifier in the master station broadcast;

the mobile transceiver broadcasts are received by a multiplicity of fixed receiver stations;

the fixed receiver stations report to the master station via a system network comprised of wireline, wireless, or a combination connectivity;

each fixed receiver report includes the mobile unit identifier, the system time stamp of the master station broadcast the mobile transceiver unit responded to, and a system time stamp from the time the mobile transceiver broadcast was received by the fixed receiver; and the master station mathematically selects the set of four fixed receiver stations with the closest to uniform ninety degree separations in spherical coordinates in relation to an initial determination of the mobile unit from the available fixed receivers reporting a mobile transceiver unit response to determine the location of the mobile transceiver unit.

2. A system of claim 1 wherein the master station broadcast has an embedded system time stamp;

the mobile transceivers update internal oscillators with the system time stamp received from the master station broadcast; and the master station synchronizes time with each of the fixed receivers.

3. A system of claim 2 wherein the master station determines the three-dimensional location of the mobile transceiver unit at the time of its response using the time difference from the initiating broadcast and the receipt of the responding broadcast at four fixed receivers and the positional relationships of the fixed receivers and the master station.

4. Systems of any one of claims 1 through 3 wherein the master station initiates a series of inquiries for specific mobile transceiver units to track the motion of the mobile transceiver unit; and the master station calculates the velocity of the mobile transceiver units from the series of mobile transceiver unit responses.

5. Systems of any one of claims 1 through 4 wherein the master station broadcast frequency and power are selected to overcome the signal blockage and interference of local structures;

the mobile transceiver unit frequency and power are selected to minimize the size, weight, and power consumption of the mobile transceiver unit; and sufficient fixed receivers are deployed to provide at least four reference points for multi-lateration without blockage or interference of local structures.

* * * * *